United States Patent

[11] 3,630,280

| [72] | Inventors | Paul W. Fischer<br>Whittier;<br>John W. Scheffel, Fullerton, both of Calif. |
|---|---|---|
| [21] | Appl. No. | 63,633 |
| [22] | Filed | Aug. 13, 1970 |
| [45] | Patented | Dec. 28, 1971 |
| [73] | Assignee | Union Oil Company of California<br>Los Angeles, Calif. |

[54] METHOD AND COMPOSITION FOR TREATING SUBTERRANEAN FORMATIONS
22 Claims, No Drawings

[52] U.S. Cl. .............................................. 166/283,
166/295, 252/8.5 LC, 260/28.5 AV
[51] Int. Cl. ..................................................... E21b 33/138,
E21b 43/26
[50] Field of Search .......................................... 166/282,
283, 294, 295, 308; 252/8.5 LC, 8.55 A; 175/72;
260/28.5 AV

[56] References Cited
UNITED STATES PATENTS

| 3,316,965 | 5/1967 | Watanabe | 166/294 X |
|---|---|---|---|
| 3,342,263 | 9/1967 | Fischer | 166/283 X |
| 3,370,650 | 2/1968 | Watanabe | 166/283 X |
| 3,440,194 | 4/1969 | Taranto et al. | 260/28.3 AV |
| 3,455,390 | 7/1969 | Gallus | 166/295 |
| 3,503,914 | 3/1970 | Tyran | 260/28.5 AV |
| 3,505,259 | 4/1970 | Hallis | 260/28.5 AV |

*Primary Examiner*—Ian A. Calvert
*Attorneys*—Milton W. Lee, Richard C. Hartman, Lannas S. Henderson, Dean Sandford and Robert E. Strauss ABSTRACT: A water-insoluble particulate composition having controlled slow oil-solubility is disclosed. The composition is comprised of solid particles of a homogeneous mixture of (1) about 4 to 8 weight percent of a high molecular weight ethylene-vinyl acetate copolymer containing about 15 to 20 weight percent vinyl acetate and exhibiting a melt index of about 1 to 5 grams per 10 minutes, (2) about 3 to 10 weight percent of a low molecular weight ethylene-vinyl acetate copolymer containing about 15 to 20 weight percent vinyl acetate and exhibiting a melt index of about 100 to 600 grams per 10 minutes, and (3) about 86 to 92 weight percent of a paraffin wax having a melting point between about 135° and 170° F. Also disclosed is a process employing this particulate composition in drilling wells into subterranean formations having a temperature between about 125° and 155° F., and in fracturing and treating such formations.

METHOD AND COMPOSITION FOR TREATING SUBTERRANEAN FORMATIONS

This invention relates to well drilling and treating, and more particularly to methods and compositions for temporarily reducing the permeability of permeable oil-bearing formations. The methods and compositions of this invention have particular application in hydraulic fracturing, in well treating, and in completing oil and gas wells that penetrate subterranean formations.

Although high fluid permeability is a desirable characteristic of a hydrocarbon producing formation, many drilling, fracturing and well treating operations are adversely affected when a well penetrates such highly permeable formations. The effectiveness and efficiency of these processes are substantially improved by temporarily plugging the more permeable strata to reduce the loss of drilling, fracturing, or well treating fluids thereto. Accordingly, low fluid loss agents have been developed for use in these applications. Also, particulate plugging agents are used as diverting agents in multiple fracturing operations, and to plug selected strata to obtain fluid shutoff.

In the aforesaid applications, it is essential that the temporary fluid loss control or plugging agent be readily removed from the hydrocarbon producing zones to prevent permanent loss of permeability and an attendant reduction in oil production rate. Removal may be effectively accomplished by utilizing an agent that is soluble in the formation hydrocarbons. However, many of the prior art materials are either insoluble under bottom hole conditions, or are so highly soluble that they are difficult to place in the formation and fail to maintain the required plug during the treating operation. It is therefore essential that the fluid loss or plugging agent possess the property of controlled solubility wherein a satisfactory solid plug will be formed for a period of time, and whereupon the plug will thereafter be removed by being slowly dissolved by the formation hydrocarbons.

It is also advantageous to utilize a material that is insoluble in water, thereby leaving any water producing strata permanently sealed. Thus, selective plugging is effected, the hydrocarbon producing strata being temporarily plugged and the water producing strata remaining permanently sealed. On removal of the temporary plugging agent from the hydrocarbon producing strata, oil and gas production capability is fully restored, while water production is permanently eliminated or substantially decreased.

Each of the aforesaid well treating processes commonly require a temporary plugging material capable of being formed into small solid particles of controlled size, preferably by an inexpensive technique. The material should be slowly soluble in the formation hydrocarbons and insoluble in water at formation conditions to accomplish the desired selective plugging and complete restoration of hydrocarbon permeability. Particle size is important in controlling the distance that the plugging agent penetrates into the formation and the degree of fluid shutoff obtained. Therefore, it is essential that the particles do not agglomerate or stick together in the treating fluid to form clumps of widely varying dimensions during the treating operation. While other properties of the particulate agent may influence particle agglomeration, agglomeration is largely controlled by the tackiness of the particle surface. Hence, it is necessary that the plugging particles or agents exhibit a low degree of tackiness on exposure to air at ambient temperatures and also remain nontacky or nonsticky upon exposure to formation hydrocarbons and to the treating fluids. In addition, particles which are somewhat resilient possess superior plugging properties since they deform to effectively fill flow passages. Also, high mechanical and impact strength is desirable to avoid size reduction of individual particles by attrition.

Various slowly oil-soluble, water-insoluble particulate agents useful in well drilling and treating operations have been developed. In particular, U.S. Pat. No. 3,316,965 discloses the use of homogeneous solid particles of nongaseous hydrocarbon and polymer; U.S. Pat. No. 3,342,263 discloses the use of discrete solid particles of a homogeneous solid mixture of a polymer and a halogenated aromatic hydrocarbon melting above about 120° F.; U.S. Pat. No. 3,363,690 discloses the use of particles of a homogeneous solid mixture of a polymer and an alcohol melting above about 120° F.; and U.S. Pat. No. 3,302,719 discloses solid particles comprised of a homogeneous mixture of polymer, wax and resin. While these compositions are satisfactory in many well drilling and treating applications, and their use has contributed greatly to increased oil-recovery, they have not been completely successful in the treatment of subterranean formations having temperatures from about 125° to 155° F.

The bottomhole temperature of a well varies with the geographical location of the well and with its depth. Many producing wells, particularly in the United States and Canada, have bottomhole temperatures between 125° and 155° F. In order that the treated wells can be returned to full production, the injected temporary plugging or diverting agents must be soluble in the reservoir oil at the reservoir temperature to the extend that substantially all of the plugging agent is removed within a reasonably short time, such as between about 1 and 6 days after returning the well to production. The solid compositions that are completely solubilized by the reservoir oil in less than 12 hours or greater than 6 days have been found to be undesirable for many of the well treating processes. Many of the compositions disclosed in the foregoing patents, while quite satisfactory for the treatment of formations having temperatures below 125° and 155° F., and fail to provide an adequate plug for a sufficient but not prolonged period of time, or do not possess the requisite properties of strength and nontackiness. Thus, there exists a need for a particulate solid composition that has the characteristic of controlled oil solubility at temperatures between about 125° and 155° F., that is insoluble in water, and that exhibits other requisite properties of hardness, strength and nontackiness.

Accordingly, it is a primary object of this invention to provide an improved well treating process for temporarily plugging subterranean formations. Another object of the invention is to provide an improved well treating process for plugging or retarding fluid flow through earth formations having a temperature between about 125° and 155° F. that does not permanently reduce the permeability of the formation to hydrocarbon fluids. Another object of the invention is to provide a process for fracturing subterranean formations wherein a diverting agent is deposited in the fracture to retard the flow of fracturing fluid therein so as to effect multiple fractures in the formation. Another object of the invention is to provide an effective low fluid loss additive for addition to a fracturing fluid. A still further object is to provide a low fluid loss additive to be added to a fluid placed in a well bore penetrating a subterranean formation which will act to temporarily reduce the formation permeability without effecting a permanent reduction of the hydrocarbon permeability of the formation. A still further object is to provide a fluid loss additive which is soluble upon prolonged contact with reservoir hydrocarbons at a temperature between about 125° and 155° F., and that remains nontacky when incorporated into a treating fluid. Other objects and advantages of the invention will be apparent to those skilled in the art from the description thereof which follows.

The foregoing objects and their attendant advantages can be attained by treating the subterranean formation with a particulate material comprises of solid particles of a homogeneous mixture consisting essentially of (1) about 4 to 8 weight percent of a high molecular weight ethylene-vinyl acetate copolymer that contains about 15 to 20 weight percent vinyl acetate and exhibits a melt index of about 1 to 5 grams per 10 minutes, (2) about 3 to 10 weight percent of a low molecular weight ethylene-vinyl acetate copolymer that contains about 15 to 20 weight percent vinyl acetate and exhibits a melt index of about 100 to 600 grams per 10 minutes and (3) about 86 to 92 weight percent of a paraffin wax melting between about 135° and 170° F.

The particulate compositions of this invention are insoluble in water and slowly soluble in oil, and are particularly useful as fluid loss control agents and as diverting or plugging agents in treating and hydraulically fracturing subterranean earth formations having a temperature between about 125° and 155° F. penetrated by a well, and in the drilling of wells into such formations. The particles can be employed in formations having higher or lower temperatures if delayed solubility is not critical to the process, or in the event that high-temperature formations are encountered, if a sufficient quantity of cool treating fluid is introduced into the well during the treating process to cool the formation adjacent to the well to a temperature within the effective temperature range of the particles for controlled oil solubility.

The oil solubility of the particulate composition can be determined by intimately contacting the particles with a test solvent such as crude petroleum recovered from the oil-bearing formation to be treated, or a similar liquid solvent, maintained at the temperature of the formation. The particulate compositions of this invention are slowly soluble in oil at a temperature of about 125° F. so that not more than 50 volume percent of the particles are dissolved by the oil during the first six hours of exposure to the oil, and at least 50 volume percent of the particles are dissolved by the oil during the last 90 hours of a 96 hour exposure period. Thus, the solid particulate composition can be employed in treating a wide range of formations as the solid particles are substantially insoluble on contact with oil at a temperature of about 125° F. for a short period of time, such as 6 hours, and are completely dissolved or dispersed in the oil upon prolonged contact therewith, such as for a period of about 96 hours, so that substantially no solid residue remains to plug the oil-bearing strata of the formation.

The oil solubility of the solid particulate compositions of this invention at the formation temperature is controlled by a unique mixture of high an low molecular weight ethylene-vinyl acetate which slow the rate of dissolution of the solid particles in oil without adversely affecting the other properties of the solid composition. While the actual molecular weights of ethylene-vinyl acetate copolymers are difficult to measure, the relative molecular weights of these polymers can be ascertained by comparison of the melt indexes of the copolymers. Melt index is inversely proportional to the copolymer molecular weight, and accordingly, as the molecular weight of the copolymer increases the melt index decreases, and as the molecular weight decreases the melt index accordingly increases. For purposes of this invention, high molecular weight copolymers are regarded as those copolymers exhibiting melt indexes below about 50, and the low molecular weight copolymers are those exhibiting molecular weights of 50 and above.

The high molecular weight ethylene-vinyl acetate copolymers useful in the practice of this invention contain from about 15 to 20 weight percent vinyl acetate and preferably from 17 to 19 weight percent vinyl acetate. It has been found that copolymers containing more than about 20 or less than 15 weight percent vinyl acetate are undesirable for purposes of this invention as they do not impart the desired properties of controlled oil-solubility to the particulate compositions. The ethylene vinyl acetate copolymers which can be employed herein generally exhibit a melt index between about 1 to 5 grams per 10 minutes and excellent results can be obtained with copolymers having a melt index between about 2 and 3 grams per 10 minutes.

A particularly preferred high molecular weight copolymer for use in the compositions of this invention is an ethylene-vinyl acetate copolymer that contains 17 to 19 weight percent vinyl acetate and exhibits a melt index of about 2.1 to 2.9 grams per 10 minutes. A commercial ethylene-vinyl acetate copolymer exemplary of this preferred copolymer is marketed by E. J. duPont de Nemours Company under the trademark ELVAX 460.

The low molecular weight ethylene-vinyl acetate copolymers useful in the practice of this invention are copolymers of ethylene and vinyl acetate containing from 15 to 20 weight percent vinyl acetate, and preferably from about 17 to 19 weight percent vinyl acetate. It has been found that copolymers containing more than 20 or less than 15 weight percent vinyl acetate are undesirable herein since they, like the high molecular weight copolymers, adversely effect the solubility of the particulate composition to the extent that the particles do not possess the desired controlled oil solubility. Low molecular weight copolymers that can be employed herein generally exhibit a melt index between about 100 and 600 grams per 10 minutes, and preferably exhibit a melt index of between about 125 and 580 grams per 10 minutes.

A particularly preferred low molecular weight copolymer for use in the compositions of this invention is an ethylene-vinyl acetate copolymer that contains from 17 to 19 weight percent vinyl acetate and exhibits a melt index of about 430 to 580 grams per 10 minutes. A commercial ethylene-vinyl acetate copolymer exemplary of this preferred copolymer is marketed by E. I. duPont de Nemours Company under the trademark ELVAX 410.

Another preferred low molecular weight copolymer is an ethylene-vinyl acetate copolymer that contains about 17 to 19 weight percent vinyl acetate and exhibits a melt index of about 125 to 175 grams per 10 minutes. A commercial ethylene-vinyl acetate copolymer exemplary of this copolymer is marketed by E. I. duPont de Nemours Company under the trademark ELVAX 420.

The term "melt index" as employed herein is the flow rate reported as the rate of extrusion in grams per 10 minutes as determined by ASTM test method D1238–65T entitled "Measuring Flow Rates of Thermoplastics by Extrusion Plastometer" and performed under Standard Test Condition E, ASTM Standards, American Society for Testing Materials, Part 27, June 1969, pages 455–566, which procedure is herein incorporated by reference.

The paraffin wax employed in the particulate compositions of this invention is a crystalline paraffin wax having a melting point between about 135° F. and 170° F., and preferably is a fully refined crystalline paraffin wax having a melting point between about 140° F. and 160° F., and more preferably between about 144° and 150° F. The paraffin wax comprises about 86 to 92 weight percent.

The compositions of this invention are readily prepared by melting the individual components and then admixing the molten liquids in the proper proportions. Alternatively, the solid ingredients can be combined in the proper proportion and then melted to obtain a homogeneous liquid mixture. In either case, the proportion of each component is selected to impart the desired properties to the final solidified product.

Compositions suitable for treating subterranean formations comprise solid particles of a homogeneous mixture of (1) about 4 to 8 weight percent of the aforementioned high molecular weight ethylene-vinyl acetate copolymers, and preferably between about 5 to 7 weight percent copolymer, and more preferably about 6 weight percent, (2) between about 3 to 10 weight percent of the above disclosed low molecular weight ethylene vinyl acetate copolymers, and preferably between about 4 and 6 weight percent of these copolymers, and (3) between about 86 and 92 weight percent of paraffin wax melting between about 135° and 170° F. and more preferably between about 86 and 90 weight percent paraffin wax.

A particularly preferred particulate composition comprises solid particles of a homogeneous mixture of (1) about 5 to 7 weight percent of a high molecular weight ethylene-vinyl acetate copolymer that contains from 17 to 19 weight percent vinyl acetate and exhibits a melt index of about 2 to 3 grams per 10 minutes, (2) about 4 to 6 weight percent of a low molecular weight ethylene vinyl acetate copolymer that contains from 17 to 19 weight percent vinyl acetate and exhibits a melt index of about 430 to 580 grams per 10 minutes, and (3) about 86 to 90 weight percent of a fully refined paraffin wax melting between about 144° and 150° F.

Another preferred composition comprises solid particles of a homogeneous mixture of (1) about 5 to 7 weight percent of a high molecular weight ethylene-vinyl acetate copolymer that contains from about 17 to 19 weight percent vinyl acetate and exhibits a melt index of about 2 to 3 grams per 10 minutes, (2) about 4 to 6 weight percent of a low molecular weight ethylene-vinyl acetate copolymer that contains from 17 to 19 weight percent vinyl acetate and exhibits a melt index of from 125 to 175 grams per 10 minutes, and (3) about 86 to 90 weight percent of a fully refined crystalline paraffin wax having a melting point between about 144° and 150° F.

The solid particles used in the practice of this invention vary widely in size and shape. Typically, these particles can be speroids, cubes, granules, buttons, flat disks, or mixture thereof, having mean diameters in the range of from about ½-inch to about 1 micron and less. More particularly, the particles can be cubes, buttons, or disks having mean diameters of from about ⅛-inch to about ½-inch, speroids or granules in the size range of from about 4 to 200 mesh U.S. Standard screen, or particles having mean diameters of from about 1 to 50 microns.

The compositions of this invention are useful in treating subterranean formations having temperatures between about 125° and 155° F., and in some instances in the treating of formations having temperatures greater than 155° F. or less than 125° F. In its broadest application, the process comprises contacting a subterranean formation penetrated by well with a suspension of solid particles of the aforesaid composition in a suitable carrier liquid injected through the well. This treatment can comprise a single temporary and selective plugging step, or it can be an integral part of a comprehensive fracturing, well drilling, acidizing, or solvent treating process. Also, the particulate composition of this invention can be effectively used as a low fluid loss agent in drilling fluids employed in well drilling and particularly as a low fluid loss agent in completion fluids employed in the drilling of oil and gas wells, and in workover fluids employed in recompleting oil and gas wells. In the drilling and workover applications, the drilling fluid is circulated from the surface to the drilling zone in a formation during the drilling operation, and at least a portion of the fluid is returned to the surface. The particulate compositions of this invention can be incorporated in a fracturing fluid employed in hydraulically fracturing an earth formation surrounding a well, and the composition can be employed in chemical treating, acidizing, and other well treating operations wherein it is desired to control fluid loss to permeable underground structures.

The particulate compositions of this invention can be more readily dispersed into a carrier liquid by the addition of a small amount of a surface active agent to the carrier liquid. Also, small amounts of a surface active agent or a mixture of surface active agents can be added to the dispersion to enhance the fluid loss properties of the particles. Furthermore, other types of fluid loss retarding agents such as viscosity increasing agents, solid inorganic particles, and the like, can be incorporated into the suspension of plugging particles, and the use of such agents in combination with the plugging particles is included within the scope of this invention.

The invention is further illustrated by the following examples which are illustrative specific modes of practicing the invention and are not intended as limiting the scope of the invention as defined by the appended claims.

EXAMPLE 1

The effect of various ethylene-vinyl acetate copolymers on the oil solubility of solid wax-copolymer particulate compositions is illustrated by this series of experiments. In each experiment a solid well treating composition is prepared by admixing in their molten state a high molecular weight ethylene-vinyl acetate copolymer, a low molecular weight ethylene-vinyl acetate copolymer and a paraffin wax. Droplets of the molten compositions are solidified to form homogeneous solid particles.

The oil solubilities of the solid compositions are determined by placing four approximately 3/16-inch diameter particles of the composition to be tested in each of four 6-dram vials filled with a solvent comprised of 70 volume percent kerosene and 30 volume percent 90 neutral oil (a paraffinic lubricating oil having a viscosity of about 90 SUS at 100° F.). The vials are placed in an oven and maintained therein at a temperature of 125° F., and rotated at approximately 16 r.p.m. for a 4 day (96 hour) contacting period. After 6 hours the vials are removed from the ovens and their contents separately poured over four 100 mesh U.S. Standard screens and the screens visually examined to determine the amount of solid particles remaining undissolved. The solvent and solid particles are replaced in their respective vials and the vials are returned to the same ovens and rotated therein for the remainder of the 96 hour contacting period. At the end of the contacting period, the contents of the vials are again separately poured over 100 mesh U.S. Standard screens and the mount of undissolved particles determined.

The results of these tests are reported in table I. The solid compositions which are less than 50 volume percent dissolved in the solvent after 6 hours and more than 50 volume percent dissolved after 96 hours, and which exhibit a solubility difference of at least 50 volume percent upon contacting the solvent during the time span between 6 and 96 hours, are considered useful for the purposes of this invention and are designated "satisfactory." The solid compositions that are more than 50 volume percent dissolved after 6 hours are designated "excessive solubility" and those compositions that are less than 50 volume percent dissolved after 6 hours and exhibit a solubility difference of less than 50 volume percent in contacting the solvent during the last 90 hours of the contacting period are designated "insoluble."

TABLE I.—SOLID/WAX ETHYLENE-VINYL ACETATE COPOLYMER COMPOSITIONS AND THEIR PROPERTIES

| Run | Low molecular weight copolymer | | | | High molecular weight copolymer | | | | Wax component | | Particle solubility |
|---|---|---|---|---|---|---|---|---|---|---|---|
| | Wt. percent | Trademark [1] | VA percent [2] | Melt index [3] | Wt. percent | Trademark [1] | VA percent [2] | Melt index [3] | Wt. percent | Melting point (° F.) | |
| 1 | | | | | 14 | ELVAX 460 | 17–19 | 2.1–2.9 | 86 | 144–150 | Insoluble. |
| 2 | | | | | 14 | ELVAX 360 | 24–26 | 1.6–2.4 | 86 | 144–150 | Excessive solubility. |
| 3 | 14 | ELVAX 420 | 17–19 | 125–175 | | | | | 86 | 144–150 | Do. |
| 4 | 14 | ELVAX 410 | 17–19 | 430–580 | | | | | 86 | 144–150 | Do. |
| 5 | 14 | ELVAX 310 | 24–26 | 335–465 | | | | | 86 | 144–150 | Do. |
| 6 | 10 | ELVAX 410 | 17–19 | 430–580 | 4 | ELVAX 460 | 17–19 | 2.1–2.9 | 86 | 165 | Satisfactory |
| 7 | 10 | ELVAX 420 | 17–19 | 125–175 | 4 | ELVAX 460 | 17–19 | 2.1–2.9 | 86 | 165 | Do. |
| 8 | 6 | ELVAX 410 | 17–19 | 430–580 | 8 | ELVAX 460 | 17–19 | 2.1–2.9 | 86 | 165 | Do. |
| 9 | 6 | ELVAX 420 | 17–19 | 125–175 | 8 | ELVAX 460 | 17–19 | 2.1–2.9 | 86 | 165 | Do. |
| 10 | 6 | ELVAX 310 | 24–26 | 335–465 | 8 | ELVAX 460 | 17–19 | 2.1–2.9 | 86 | 144–150 | Insoluble. |
| 11 | 6 | ELVAX 410 | 17–19 | 430–580 | 8 | ELVAX 360 | 24–26 | 1.6–2.4 | 86 | 144–150 | Excessive solubility. |
| 12 | 4 | ELVAX 410 | 17–19 | 430–580 | 10 | ELVAX 460 | 17–19 | 2.1–2.9 | 86 | 144–150 | Insoluble. |
| 13 | 4 | ELVAX 410 | 17–19 | 430–580 | 8 | ELVAX 460 | 17–19 | 2.1–2.9 | 88 | 144–150 | Satisfactory. |
| 14 | 4 | ELVAX 410 | 17–19 | 430–580 | 6 | ELVAX 460 | 17–19 | 2.1–2.9 | 90 | 144–150 | Do. |
| 15 | 4 | ELVAX 420 | 17–19 | 125–175 | 10 | ELVAX 460 | 17–19 | 2.1–2.9 | 86 | 144–150 | Insoluble. |
| 16 | 4 | ELVAX 420 | 17–19 | 125–175 | 6 | ELVAX 460 | 17–19 | 2.1–2.9 | 90 | 144–150 | Satisfactory. |

[1] Elvax copolymers are marketed by E. I. du Pont de Nemours Company.
[2] Vinyl acetate content of ethylene-vinyl acetate copolymer.
[3] Melt index as determined by ASTM-1238-65T.

In the above table, runs 1–5 illustrates that wax-copolymer compositions containing only a high molecular weight or a low molecular weight ethylene-vinyl acetate copolymer do not exhibit satisfactory oil solubilities for the purposes of this invention. Runs 6–9 demonstrate the operable concentration ranges of about 4 to 8 weight percent high molecular weight copolymer and about 3 to 10 weight percent low molecular weight copolymer. Runs 10 and 11 demonstrate the effect of vinyl acetate content of the copolymers on the oil solubility of the particular compositions, and runs 12–16 demonstrate the effective wax concentration as being from about 86 to 92 weight percent.

EXAMPLE 2

A diverting agent composition is prepared by admixing in their molten states (1) 4 weight percent of a low molecular weight ethylene-vinyl acetate copolymer containing about 17 to 19 weight percent vinyl acetate and exhibiting a melt index of about 125 to 175 grams per 10 minutes, (2) about 6 weight percent of a high molecular weight ethylene-vinyl acetate copolymer that contains about 17 to 19 weight percent vinyl acetate and exhibits a melt index of about 2.1 to 2.9 grams per 10 minutes, (3) about 89.9 weight percent of a molten paraffin wax that has a melting point of about 144° to 150° F., and (4) 0.1 weight percent of 2,6-ditertiary butyl-para-cresol, and oxidation inhibitor.

The molten wax-copolymer composition is formed into discrete solid particles of the following size ranges:
1. Flat buttons having a thickness of approximately 1/16-inch and a diameter of about ½-inch to ⅝-inch;
2. Particles having sizes in the range of about 8 to 100 mesh U.S. standard screen; and
3. Particles having sizes in the range of about 1 micron to 100 mesh U.S. standard screen.

Approximately 50 percent of the particles in the 8 to 100 mesh size range have sizes in the range of 8 to 20 mesh U.S. standard screen and about 50 percent have sizes in the range of 20 to 100 mesh.

EXAMPLE 3

This example illustrates the use of the method and composition of this invention in treating a subterranean, oil-containing reservoir to stimulate the recovery of oil therefrom. The well is completed in a relatively shallow reservoir having a temperature of 125° to 155° F., with a total productive interval of 10 feet perforated with two holes per foot at the depths of 3,066 to 3,072 feet and 3,082 to 3,086 feet.

The stimulation treatment is performed by injecting 3,000 gallons of 15 weight percent hydrochloric acid into the well, then introducing 12 pounds of particulate diverting agent, and then injecting another 3,000 gallons of acid. The diverting agent comprises flat buttons, approximately ¼-inch to ⅝-inch in diameter, of the slowly oil-soluble, water-insoluble homogeneous solid composition described in example 2. The initial slug of acid is injected into the well under vacuum. However, the second slug of acid injected after treatment with the diverting agent particles is injected at a surface pressure of 1,100 p.s.i.g.

Upon completion of the acid injection, the well is flushed with lease crude and then with water, and the well returned to production. The production rate of oil is observed and found to be substantially higher than the rate prior to the stimulation treatment, which indicates that the stimulation treatment is successful and that the diverting agent particles are substantially removed from the oil-producing zones.

EXAMPLE 4

This example illustrates the use of the method and composition of this invention in fracturing a subterranean oil-producing formation. A production well is completed in a relatively shallow reservoir having a temperature of 125° to 155° F., with a total productive interval of 15 feet perforated with two holes per foot at the depths of 2,903 to 2,908 feet and 2,918 to 2,928 feet.

Fracturing is accomplished by injecting 10,000 pounds of 20 to 40 mesh sand in 10,000 gallons gelled brine into the well at a volume flow rate and pressure sufficient to fracture the formation. After approximately one-half of the fracturing fluid is injected, 10 pounds of diverting agent particles are slugged into the well and the fracturing fluid injection continued. The diverting agent comprises flat buttons approximately ¼-inch to ⅝-inch in diameter of the slowly oil-soluble, water-insoluble homogeneous solid composition described in example 2. The initial portion of the fracturing fluid is injected at a surface pressure of 950 p.s.i.g. However, the injection pressure is increased to 1,500 p.s.i.g. after treatment with the diverting agent.

Upon completion of the fracturing operation, the well is flushed with lease crude and returned to production. The production rate of oil is observed and found to be substantially higher than the rate prior to fracturing, which indicates that the fracturing operation is successful and that the diverting agent particles are substantially removed from the oil-producing zones.

EXAMPLE 5

This example illustrates the use of the method and composition of this invention in drilling a well into a formation having a temperature of 125° to 155° F. This well had previously been drilled to a depth of 3,108 feet and then plugged to a depth of 2,924 feet with pea gravel and cement. For a number of years the well was produced from a productive interval from 2,911 to 2,922 feet. However, it is now desired to open lower zones to production.

The plug is drilled out using a 3¾-inch-diameter bit on a conventional tubing string. Brine is used as a drilling fluid, and is circulated from the surface to the drilling zone and returned to the surface. The well is drilled from 2,924 feet to 3,005 without incident, but circulation is lost to the formation at 3,005 feet. Approximately 750 pounds of diverting agent particles are added to a gelled brine and the drilling resumed using this material as the drilling fluid. The diverting agent comprises particles of the slowly oil-soluble, water-insoluble homogeneous solid composition described in example 2, the particles having sizes in the range of 8 to 100 mesh U.S. standard screen, with approximately 50 percent of the particles having sizes in the range of 8 to 20 mesh and 50 percent having sizes in the range of 20 to 100 mesh. After addition of the diverting agent, good fluid circulation is observed. Drilling is continued to a depth of 3,108 feet without further difficulty.

The gelled brine is displaced from the well with ungelled brine, and again the formation did not take fluid. Then, 14 barrels of lease crude is placed in the well and allowed to stand overnight. After the oil soak, it is observed that the formation is open and readily capable of taking fluid.

While particular embodiments of the invention have been described it will be understood, of course, that the invention is not limited thereto since many obvious modifications can be made, and it is intended to include within this invention any such modifications as will fall within the scope of the claims.

The invention having thus been described, we claim:

1. A method of treating subterranean formations penetrated by a well bore comprising injecting through said well bore and into contact with said formation a liquid having suspended therein discrete slowly oil-soluble, water-insoluble, solid particles comprised of a homogeneous mixture of (1) about 4 to 8 weight percent of a high molecular weight ethylene-vinyl acetate copolymer that contains about 15 to 20 weight percent vinyl acetate and exhibits a melt index of about 1 to 5 grams per 10 minutes, (2) about 3 to 10 weight percent of a low molecular weight ethylene-vinyl acetate copolymer that contains about 15 to 20 weight percent vinyl acetate and exhibits a melt index of about 100 to 600 grams per 10 minutes, and (3) about 86 to 92 weight percent of a paraffin wax having a melting point between about 135° and 170° F.

2. The method defined in claim 1 wherein said high molecular weight ethylene-vinyl acetate copolymer contains about 17 to 19 weight percent vinyl acetate and exhibits a melt index of about 2 to 3 grams per 10 minutes.

3. The method defined in claim 2 wherein said low molecular weight ethylene-vinyl acetate copolymer contains about 17 to 19 weight percent vinyl acetate and exhibits a melt index of about 125 to 175 grams per 10 minutes.

4. The method defined in claim 1 wherein the temperature of said formation is between about 125° and 155° F.

5. The method defined in claim 1 wherein said mixture contains about 88 to 90 weight percent of said paraffin wax.

6. The method of completing a well drilled into a permeable subterranean formation which comprises circulating a completion fluid from the surface to a drilling zone in said formation during the drilling operation and returning to the surface at least a portion of said fluid, said completion fluid comprising a liquid having suspended therein discrete slowly oil-soluble, water-insoluble, solid particles comprised of a homogeneous mixture of about 4 to 8 weight percent of a high molecular-weight ethylene-vinyl acetate copolymer that contains about 15 to 20 weight percent vinyl acetate and exhibits a melt index of about 1 to 5 grams per 10 minutes, (2) about 3 to 10 weight percent of a low molecular weight ethylene-vinyl acetate copolymer that contains about 15 to 20 weight percent vinyl acetate and exhibits a melt index of about 100 to 600 grams per 10 minutes, and (3) about 86 to 92 weight percent of a paraffin wax having a melting point between about 135° and 170° F.

7. The method defined in claim 6 wherein said high molecular weight ethylene-vinyl acetate copolymer contains about 17 to 19 weight percent vinyl acetate and exhibits a melt index of about 1 to 5 grams per 10 minutes.

8. The method defined in claim 7 wherein said low molecular weight ethylene-vinyl acetate copolymer contains between about 17 to 19 weight percent vinyl acetate and exhibits a melt index of about 125 to 175 grams per 10 minutes.

9. The method defined in claim 6 wherein the temperature of said formation is between about 125° and 155° F.

10. A method of fracturing a permeable subterranean formation penetrated by a well which comprises injecting a fracturing fluid into said well and into contact with said formation at a pressure and volumetric flow rate sufficient to fracture said formation, said fracturing fluid comprising a liquid having suspended therein discrete oil-soluble, water-insoluble, solid particles of a homogeneous mixture of (1) about 4 to 8 weight percent of a high molecular weight ethylene-vinyl acetate copolymer that contains about 15 to 20 weight percent vinyl acetate and exhibits a melt index of about 1 to 5 grams per 10 minutes, (2) about 3 to 10 weight percent of a low molecular weight ethylene-vinyl acetate copolymer that contains about 15 to 20 weight percent vinyl acetate and exhibits a melt index of about 100 to 600 grams per 10 minutes, and (3) about 86 to 92 weight percent of a paraffin wax having a melting point between about 135° and 170° F.

11. The method defined in claim 10 wherein said high molecular weight ethylene-vinyl acetate copolymer contains about 17 to 19 weight percent vinyl acetate and exhibits a melt index of about 1 to 5 grams per 10 minutes.

12. The method defined in claim 10 wherein said low molecular ethylene-vinyl acetate copolymer contains about 17 to 19 weight percent vinyl acetate and exhibits a melt index of about 125 to 175 grams per 10 minutes.

13. The method defined in claim 10 wherein the temperature of said formation is between about 125° and 155° F.

14. A well treating composition comprising discrete solid particles of a homogeneous mixture of (1) about 4 to 8 weight percent of a high molecular weight ethylene-vinyl acetate copolymer that contains about 15 to 20 weight percent vinyl acetate and exhibits a melt index of about 1 to 5 grams per 10 minutes, (2) about 3 to 10 weight percent of a low molecular weight ethylene-vinyl acetate copolymers that contains about 15 to 20 weight percent vinyl acetate and exhibits a melt index of about 100 to 600 grams per 10 minutes, and (3) about 86 to 92 weight percent of a paraffin wax having a melting point between about 135° and 170° F.

15. The composition defined in claim 14 wherein said wax has a melting point between about 144° and 150° F.

16. The composition defined in claim 14 wherein said high molecular weight ethylene-vinyl acetate copolymer contains about 17 to 19 weight percent vinyl acetate and exhibits a melt index of about 2 to 3 grams per 10 minutes.

17. The composition defined in claim 16 wherein said low molecular weight ethylene-vinyl acetate copolymer contains about 17 to 19 weight percent vinyl acetate and exhibits a melt index of about 125 to 175 grams per 10 minutes.

18. The composition defined in claim 16 wherein said low molecular weight ethylene-vinyl acetate copolymer contains about 17 to 19 weight percent vinyl acetate and exhibits a melt index of about 430 to 580 grams per 10 minutes.

19. The composition defined in claim 14 wherein said discrete particles have a mean diameter within the range of about 1 micron to about ½-inch.

20. The composition defined in claim 14 wherein said paraffin wax is present in an amount between about 88 and 90 weight percent.

21. A well treating composition comprising discrete solid particles of a homogeneous mixture consisting essentially of (1) about 6 weight percent of an ethylene-vinyl acetate copolymer that contains about 17 to 19 weight percent vinyl acetate and that exhibits a melt index of about 2 to 3 grams per 10 minutes, (2) about 4 weight percent of an ethylene-vinyl acetate copolymer that contains about 17 to 19 weight percent vinyl acetate and exhibits a melt index of about 125 to 175 grams per 10 minutes, and (3) a fully refined crystalline paraffin wax having a melting point between about 144° and 150° F.

22. A well treating composition comprising discrete solid particles of a homogeneous mixture consisting essentially of (1) about 6 weight percent of an ethylene-vinyl acetate copolymer that contains about 17 to 19 weight percent vinyl acetate and exhibits a melt index of about 2 to 3 grams per 10 minutes, (2) about 4 weight percent of an ethylene-vinyl acetate copolymer that contains about 17 to 19 weight percent vinyl acetate and exhibits a melt index of about 430 to 580 grams per 10 minutes, and (3) a fully refined, crystalline paraffin wax having a melting point between about 144° and 150° F.

* * * * *